Aug. 14, 1951     J. C. DUDDY     2,564,397
MICROPOROUS DIAPHRAGMS AND METHOD OF MAKING THE SAME
Filed May 16, 1945
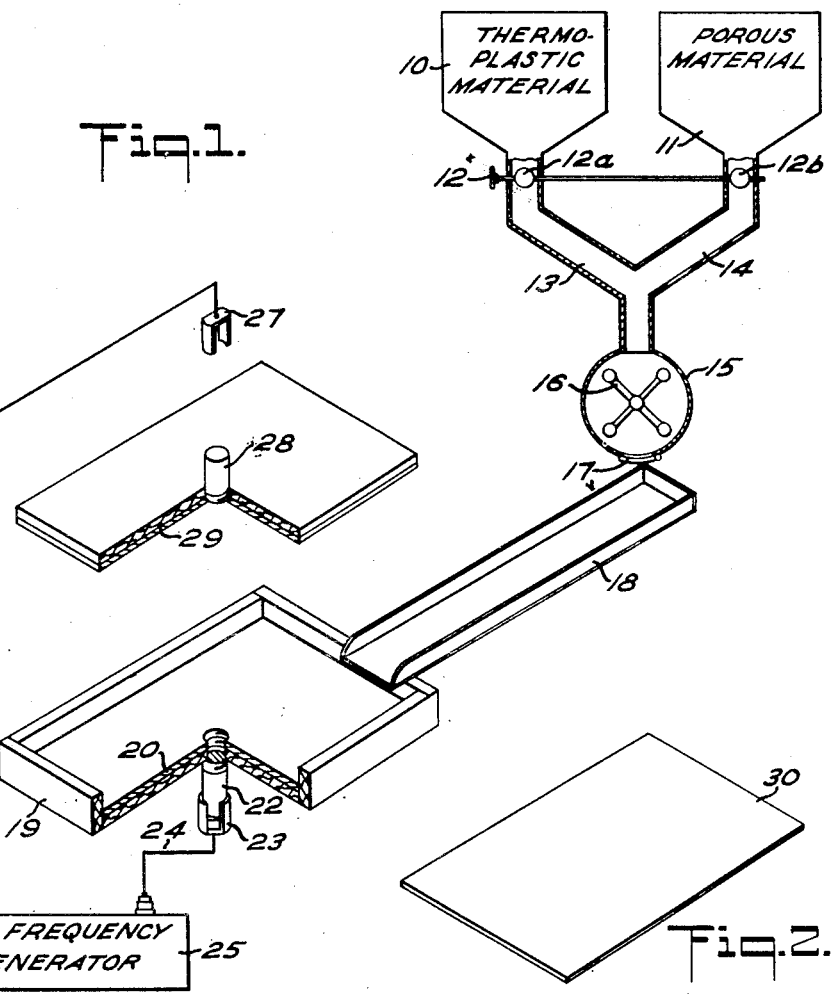
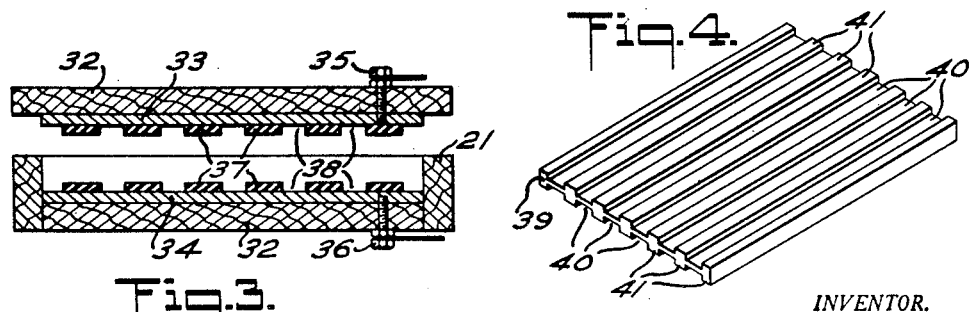
INVENTOR.
JOSEPH CHARLES DUDDY
BY
Augustus B. Stoughton
ATTORNEY Patented Aug. 14, 1951

2,564,397

UNITED STATES PATENT OFFICE 2,564,397

MICROPOROUS DIAPHRAGMS AND METHOD OF MAKING THE SAME

Joseph Charles Duddy, Philadelphia, Pa., assignor to The Electric Storage Battery Company, a corporation of New Jersey Application May 16, 1945, Serial No. 594,081

4 Claims. (Cl. 136—146)

This invention relates to microporous diaphragms having chemical, electrical and mechanical properties which make them suitable for many applications but particularly desirable for use as a separator for storage batteries.

It has heretofore been proposed to fabricate separators for storage batteries by mixing such substances as diatomaceous earth with rubber and to apply heat to set the same. It has also been proposed to utilize thermoplastic artificial resins alone for the manufacture of filters. With respect to the latter suggestion, it has been proposed that the particles of the starting material be a polymerization product of alpha-methylacrylic acid or particles of a vinyl polymerizate of hydrocarbon character. It has been further suggested that these particles be treated with a solvent temporarily to soften them for agglomeration or that they shall be heated until softened, and then compressed into bonding relation. When such materials are to be used for storage battery separators it is desirable that they be treated with a wetting agent.

The requirements of separators suitable for use in storage batteries are definite. They must possess sufficient mechanical strength to withstand insertion between the plates of the battery and to withstand handling by factory workers. Electrically, they must be of relatively low resistance of the order of 0.001 ohm per square inch per mil of thickness. Chemically they must be inert to the electrolyte and to electrolytic action. They also must have sufficient heat stability so as to maintain their original dimensions and shape throughout the ordinary operating temperature range encountered in any given battery application. Heat stability of the character described results from the fact that the materials are subjected to elevated temperatures, which have an annealing or strain-relieving effect, during manufacture. The diaphragms have good wetting properties. If separators are formed entirely of thermoplastic resins they are difficult to wet and if the required porosity is attained they lack the needed mechanical strength. If sufficient pressure is applied to secure the requisite strength, the particles are compacted to such a degree as to reduce the porosity and to increase the electrical resistance.

In carrying out the present invention there is provided a microporous diaphragm which comprises particles of a thermoplastic binder in coherent relation one to the other and having dispersed therethrough particles of a material having high porosity and characterized by interrupted surfaces interlocked with the binder particles. In the development of the present invention it was discovered that some thermoplastic particles are of elongated shape while others are spherical or spheroidal, depending on the method of manufacture. In accordance with the present invention, thermoplastic materials whose particles are of non-spherical or non-spheroidal shape are intimately mixed with highly porous particles, the ratio being approximately 20% to 50% by weight of porous particles with the remainder thermoplastic binder. Such a mixture is then formed into the desired configuration for the diaphragm or storage battery separator. Heat is generated within the mixture itself to elevate the temperature of the thermoplastic particles until they become coherent. As their temperature approaches the desired value they change substantially in shape. Probably due to a combination of surface tension and internal stresses they change their elongated shape to one which tends to be spherical. Accordingly there is movement of the thermoplastic particles within and throughout the mixture. In so moving their outer surfaces contact and are cohesively bonded to adjacent thermoplastic particles, and they move into and around the interrupted surfaces of the porous particles. There is thus produced not only a cohesive bond between thermoplastic particles but also a mechanical interlocking between the thermoplastic particles and the porous particles. The result is a microporous diaphragm having relatively high mechanical strength, low electrical resistance, permeable to ionic flow and which is chemically inert to electrolytes and electrolytic action and which has good heat stability characteristics.

For a more complete understanding of my invention and for further objects and advantages thereof, reference should now be had to the accompanying description taken in conjunction with the drawing in which:

Fig. 1 diagrammatically illustrates, partly in perspective, a system of carrying out the invention;

Fig. 2 illustrates a perspective view of one form of microporous diaphragm made in accordance with the invention;

Fig. 3 is a sectional view of a modified mold; and

Fig. 4 illustrates the form of a diaphragm or separator made in the mold of Fig. 3.

Referring to the drawing, discrete particles of a thermoplastic binder are placed within a suitable hopper or bin 10. The thermoplastic binder may consist of Vinylite, preferably the copolymer consisting of 87% vinyl chloride and 13% vinyl acetate. The binder particles may also be polyethylene, a highly inert material with respect to electrolytes. The particles of both binders are nearly all of non-spheroidal shape. It is preferred that the particle size of such binders be such that the bulk of them will pass through a 100-mesh screen. They may be larger but it has been found that the smaller particles are readily available on the market, and may be satisfactorily utilized. The binder may also consist of particles of an acrylic resin, preferably of the non-spherical shape so that they may change to a spherical or spheroidal shape upon heating. Another suitable binder consists of particles of polystyrene of such size that the bulk of them will pass through a 100-mesh screen. These thermoplastic materials are at present preferred, but having set forth the principal requirements, it will be understood that other thermoplastic resins may be utilized. It will be understood that suitable mixtures of thermoplastic resins may also be utilized.

Further in accordance with the invention, a highly porous material is placed within a second bin or hopper 11, such material having discrete particle sizes of the order of those of the binder. The preferred material comprises particles of a diatomaceous earth. Though a diatomaceous earth of the "Superfloss" grade has been utilized, the one available on the market under the tradename Johns-Manville "Celite No. 545," is preferred. The particles thereof measure less than 10 microns. and their outer surfaces are highly irregular. The particles themselves are likewise highly irregular. Their irregularity serves effectively for mechanical interlocking with the thermoplastic particles. The preferred diatomaceous earth has the highest porosity of materials now available, and that characteristic assists in producing the desired porosity in the diaphragm or battery separator. While diatomaceous earth is the preferred porous material, other materials such as wood flour, pulverized silica gel, bentonite clays and the like, may be employed.

By moving the common valve 12 to its open position, thermoplastic material and porous material will flow downwardly through pipes 13 and 14 into a mixer 15. The respective vanes 12a and 12b, or other suitable flow-controlling means, may be adjusted so as to produce the desired proportion of porous material and binder, or measured quantities of each may be introduced into the mixer 15. The mixer itself may be of any suitable type which in a few revolutions of an element 16, will serve to disperse the particles of porous material throughout the thermoplastic material. Thereafter the mixture may be withdrawn from the mixer 15 as by way of the door 17. The mixture may flow by way of a chute 18 into a mold 19, or again a measured quantity of the mixture may be withdrawn through the door 17 and introduced into the mold 19.

The exterior walls of the mold 19 are preferably made of an insulating material. Wood is an inexpensive and satisfactory material. The mold 19 is provided with a metallic plate 20. A terminal 22 has one end threaded or otherwise in good electrical contact with the metal plate 20. The opposite end of the terminal post 22 has secured to it, as by the clip 23, a conductor 24 leading from a high-frequency generator 25. The other conductor 26 of the high-frequency generator terminates in a clip 27 arranged to be secured to a terminal post 28, electrically connected to a metallic plate 29, which comprises and forms the surface of the upper mold-plate. The plate 29 is of a size so as to nest within the opening in the mold 19. Adequate pressure may be applied by reason of the weight of the upper mold-plate. The pressure to be utilized is quite low, of the order of one or two pounds per square inch, this pressure being low enough so as gently to press the particles together without mechanically deforming the binder after softening thereof.

With the mixture of material evenly spread in the mold 19, the upper plate 29 is placed in position and the connection to the high-frequency generator 25 is completed by placing the clip 27 on the terminal post 28. Heat is then generated in the mixture itself by application of high-frequency electrical energy. High-frequency generators of the type indicated at 25 are well known in the generator art. The metallic-conducting plates 20 and 29 form the respective electrodes of a capacitor and the mixture of material disposed therebetween forms the dielectric thereof.

The generator 25 is preferably designed to produce energy at a variable voltage and a fixed frequency. The limiting factor in the selection of the frequency of the generator is the economic balance between the increased cost of the apparatus for a given increase in frequency and the increment of heating effect resulting from the higher frequency bearing in mind that above certain limits, the overall efficiency decreases with the higher frequencies. Generators with a frequency as low as 12 megacycles have been found to be satisfactory from both the cost and operational viewpoints. The use of generators of higher frequencies is only limited by the considerations outlined above. With the frequency thus established, the variable voltage of the generator makes possible various rates of heating. The limiting factor in voltage selection or adjustment is the "break down" voltage of the capacitor formed by the electrodes and the mixture of binder and porous material therebetween. For the maximum rate of production of a diaphragm of a given size, the operating voltage selected should be just below the voltage value which produces arcing or "break down" in the material between the electrodes.

With a 1-kw. generator having a frequency of 13 megacycles per second, a mixture of 70% by weight of VYHH-Vinylite, as manufactured by the Carbide and Carbon Chemicals Corporation, and 30% by weight of Johns-Manville "Celite No. 545," between the electrodes, and with the voltage adjusted to a maximum voltage value which is just below the "break down" value, a diaphragm having dimensions of approximately 9" x 6" x .05" was produced in approximately 45 seconds after establishment of the operating cycle. Immediately upon removal of the high-frequency energy at the end of the heating portion of the cycle, temperatures of approximately 250° F. have been observed in the heated mass. At such temperatures the aforesaid copolymer of Vinylite becomes softened and the elongated particles thereof materially alter their shape and in so doing move together and in and around the particles of "Celite." The particles of "Celite" are not only mechanically interlocked in the binder, but the particles of binder cohere to each other. The structural change which takes place in the mixture evidences itself by a shrinkage effect. Where the upper electrode rests directly on the surface of the mixture and its travel is unimpeded, the shrinkage is substantially all in a height reduction. Reductions of the order of 50% of the original height have been observed. Where the travel of the upper plate is limited, the shrinkage effect takes place uniformly throughout the volume of the material and not only the height but also the length and width are reduced. The amount of shrinkage resulting in any mixture can be determined by test and this shrinkage can be allowed for in the mold design and in the measured quantities of the materials placed therein so that a diaphragm of desired proportions will be produced.

To facilitate removal of the diaphragm 30 from the mold while it is still hot, a mold-coating comprising an aqueous soap solution containing particles of "Celite" in suspension can be applied to the surfaces of the electrodes. In place of the mold-coating a sheet of varnished drill comprising a cotton fabric impregnated with a phenolic resin or a sheet of "Kraft" paper may be placed over the surfaces of the electrodes. These materials will conform to the electrode surfaces and will adhere to the hot mixture. After removal from the mold and cooling, the varnished drill or paper may be stripped off and reused. If desired, a sheet or thin mat of glass wool may be used as a substitute for the mold-coat. When such a material is used, however, it is contemplated that it will form an integral part of the diaphragm 30 produced and will not be stripped off at the end of the process, thereby producing a combined microporous diaphragm and mechanical retainer.

It is possible in accordance with this invention to produce a microporous diaphragm having ribs integrally formed therein. In producing such a diaphragm, it is necessary to provide a mold which will insure uniform heating of both the rib and the web portion of such diaphragms. In other words, means must be provided for insuring that when subjected to the high-frequency energy there will be no tendency for the thinner web section to be heated more than the thicker rib section of the diaphragm. In accordance with this invention, a mold such as shown in Fig. 3 is provided in which 32 is the outer casing of wood. Positioned in the upper and lower parts of the casing are solid metal electrodes 33 and 34 which are provided with suitable terminals 35 and 36 for connection to the high-frequency generator as shown in Fig. 1. Provided on the exposed faces of the electrodes are insulating strips 37 which are dimensioned and spaced to produce the desired ribbing effect. The insulating material selected for the strips is chosen so that its dielectric loss-factor, which is a measure of its ability to absorb high-frequency energy, approaches the dielectric loss-factor of the mixture. Suitable insulating materials are the harder woods such as maple, oak, chestnut, etc., thermosetting plastics such as phenolic strips, impregnated fabrics, glass or glass-mica compositions. The choice of material will depend upon the relative quality of the bonding of the binder particles at the rib and web portions of the diaphragm. The purpose of the insulating ribs 37 is to produce a uniform path between the electrodes irrespective of whether the space therebetween is filled with the mixture of plastic binder and porous material or is filled with a reduced quantity of such mixture and the web-forming sections on the electrodes. In other words, by utilizing ribs 37, the web-forming sections, of a material selected in terms of the dielectric properties of the mixture of binder and porous material, the electrical field is not concentrated in the regions of minimum thickness. Thus, if metal ribs were used, there would be concentrated electric fields across the web-forming sections with overheating thereof. In accordance with the invention, not only is the electric field maintained relatively uniform as between the rib-forming sections 37 and the web-forming sections 38, but there is also obtained uniformity in the product as between those sections. There will thus be produced a diaphragm 39 (Fig. 4) suitable for use as a storage battery separator having uniform porosity and resistance per unit of thickness at the web sections 40 and rib sections 41. It is apparent that if it is desired to control the porosity of the diaphragm so that there is a variation between the porosity at the rib and at the web sections, this may be done by varying the material of the ribs 37 on the electrodes. By proper selection of the material for the rib sections 37, it is possible to make the web of the diaphragm less porous than the rib, thereby producing a diaphragm having alternate porous and dense portions.

The described electrical method of heating the mixture greatly contributes to the character of the final product. The metallic electrodes 20 and 29 are not directly heated by the high-frequency energy. They remain cooler than the mixture of the material, though their temperature is elevated by conduction of heat to them from the mixture. In general the mixture is uniformly heated by the heat generated therein by the high-frequency energy. However, there is a loss of heat at the surfaces of the mixture so that there is a flow of heat outwardly from the center to the surfaces. Thus, the highest temperature occurs midway of the mixture. This means that the thermoplastic particles are more strongly bonded together at the center of each diapharagm or separator 30 than at points more remote therefrom or nearer the surfaces. The result is that the final diaphragm or separator 30 has a substantially greater strength than like separators produced by the prior art hot-plate method of heating. There is avoided "surface-glaze" with its resultant decrease in porosity. Moreover, in order to obtain the necessary mechanical strength by means of the hot-plate method the differential in temperature between the surface and the center of the mixture must be so great that the aforesaid "surface-glaze" not only decreases the porosity but also increases the electrical resistance of the separator beyond what is desired. In addition, in practicing the hot-plate method, the surface temperatures of the plates are, in general, so high that the decomposition temperature of the adjacent particles of binder is exceeded, thereby resulting in products which may produce undesirable effects when the diaphragm is used as a separator in a storage battery.

Since the method herein described provides for uniformly subjecting all of the binder to a temperature which produces shape and dimensional changes in the particles, and since this temperature is well above the highest operating temperature for any type of storage battery, the diaphragm is especially suited for use as a separator because of its heat stability. In other words, the described method of heating produces a battery separator which will maintain its size and shape when subjected to temperatures resulting from the most adverse battery operating conditions.

In practicing the invention it was found that the high-frequency heating is facilitated by preheating the mold prior to the first application of the high-frequency energy. The mold is heated to within the range of 180° F. to 300° F. It is then filled with the mixture of porous material and binder and high-frequency energy applied thereto. Thereafter, the generation of the heat in the material will maintain the temperature of the mold. The heat stored in the mold during each heating cycle will be adequate to preheat each subsequent batch of the mixture enough to facilitate the high-frequency heating thereof.

It has been further found that some of the thermoplastic resins are difficult to heat. For example, polyethylene is itself used for electrical insulating purposes because of its low loss-factor. With a frequency of 13 megacycles it was found that particles of polyethylene could not be heated. However, when such particles were mixed with 20% to 50% by weight of a porous material comprising the diatomaceous "Celite," no difficulty was experienced in generating the desired amount of heat to produce the final product, the separator plate 30. In general, it has been found that a mixture of the aforesaid type heats more readily than particles wholly consisting of either the binder or the porous material.

It is again emphasized the gradation in the bond from a highly effective bond at the center of the diaphragm to one which is only strong enough to hold the porous particles at the surfaces of the diaphragm is of great importance. By producing a strong bond at the center of the diaphragm, mechanical strength is provided while the minimum bonding at the surfaces assures high porosity. Thus, the product may be likened to a laminated structure in which the central lamina is strong, porous and flexible while the outer laminae, while less flexible and less strong, are highly porous and permeable.

While preferred embodiments of the invention have been described, it will be understood that further modifications may be made without departing from the spirit and scope of the invention as set forth in the appended claims.

What is claimed is:

1. A microporous storage battery separator of high porosity consisting of discrete cohering particles of thermoplastic binder having dispersed therethrough particles of diatomaceous earth mechanically held therein, the coherence of said binder particles being greatest internally of said separator, the binder particles on the surfaces merely being bound in a sufficient degree to retain said particles of diatomaceous earth.

2. A microporous storage battery separator consisting of cohering discrete particles of a thermoplastic binder selected from the group consisting of vinyl chloride and copolymers thereof, polyethylene, polystyrene, and acrylic resins, and mechanically retained particles of diatomaceous earth dispersed therethrough, said binder particles being more strongly cohered internally of said separator than at the surfaces thereof, the binder particles on the surfaces merely being bound in a sufficient degree to retain said particles of diatomaceous earth.

3. The method of making storage battery microporous separators which consists in intimately dry-mixing particles of a thermoplastic binder with particles of a highly porous material, shaping the mixture by applying light pressure thereto, while so shaped and under said light pressure applying high-frequency electrical energy to generate heat within the mixture thereby raising the temperature of the mixture until the binder particles cohere and move into interlocking engagement with said porous particles, and controlling the temperature rise of said shaped mixture to produce a higher temperature internally than adjacent the surfaces thereof.

4. A microporous storage battery separator consisting of particles of the copolymer of vinyl resin consisting of about 87% vinyl chloride and about 13% vinyl acetate which have been cohered together and having dispersed therethrough particles of diatomaceous earth mechanically held therein, the particles of said copolymer being more strongly cohered internally of said separator than those near the surface.

JOSEPH CHARLES DUDDY.

REFERENCES CITED

The following references are of record in the file of this patent:

UNITED STATES PATENTS

| Number | Name | Date |
|---|---|---|
| 1,366,223 | Wales | Jan. 18, 1921 |
| 2,043,954 | Kershaw | June 9, 1936 |
| 2,155,016 | Kershaw | Apr. 18, 1939 |
| 2,175,798 | Hauser | Oct. 10, 1939 |
| 2,233,176 | Melton et al. | Feb. 25, 1941 |
| 2,280,771 | Dufour et al. | Apr. 28, 1942 |
| 2,290,917 | Smith | July 28, 1942 |
| 2,297,248 | Rudolph | Sept. 29, 1942 |
| 2,304,958 | Rouy | Dec. 15, 1942 |
| 2,307,091 | Yngve | Jan. 5, 1943 |
| 2,307,180 | Yngve | Jan. 5, 1943 |
| 2,341,617 | Hull | Feb. 15, 1944 |
| 2,361,900 | Lowry et al. | Oct. 31, 1944 |
| 2,374,540 | Hall | Apr. 24, 1945 |
| 2,400,091 | Alfthan | May 14, 1946 |

FOREIGN PATENTS

| Number | Country | Date |
|---|---|---|
| 110,204 | Great Britain | Oct. 17, 1917 |

OTHER REFERENCES

"Radio Frequency Technology in Wood Application," by George F. Russell and Julius W. Mann, Dec. 1943.